(12) United States Patent
Cordle

(10) Patent No.: US 9,624,685 B1
(45) Date of Patent: Apr. 18, 2017

(54) MOUNT SYSTEM FOR AN UMBRELLA

(71) Applicant: Ian Blake Cordle, Napa, CA (US)

(72) Inventor: Ian Blake Cordle, Napa, CA (US)

( * ) Notice: Subject to any disclaimer, the term of this patent is extended or adjusted under 35 U.S.C. 154(b) by 0 days.

(21) Appl. No.: 15/215,219

(22) Filed: Jul. 20, 2016

Related U.S. Application Data

(63) Continuation-in-part of application No. 15/043,416, filed on Feb. 12, 2016, now abandoned.

(60) Provisional application No. 62/115,566, filed on Feb. 12, 2015.

(51) Int. Cl.
*F16M 13/00* (2006.01)
*E04H 12/22* (2006.01)
*A45B 25/00* (2006.01)
*F16B 47/00* (2006.01)

(52) U.S. Cl.
CPC ......... *E04H 12/2238* (2013.01); *A45B 25/00* (2013.01); *F16B 47/00* (2013.01); *A45B 2025/003* (2013.01); *A45B 2200/109* (2013.01)

(58) Field of Classification Search
CPC ..... E04H 112/2238; F16M 11/14; A45F 3/44; A45B 2200/109
USPC ........ 248/181.2, 288.51, 514–516, 530, 534, 248/536, 537
See application file for complete search history.

(56) References Cited

U.S. PATENT DOCUMENTS

| | | | | |
|---|---|---|---|---|
| 3,304,036 A | * | 2/1967 | Davis | A45B 11/00 248/229.14 |
| 3,568,963 A | * | 3/1971 | Koskinen | A45B 17/00 248/516 |
| 2003/0051748 A1 | * | 3/2003 | Wu | A45B 11/00 135/16 |
| 2015/0060631 A1 | * | 3/2015 | Pan | E04H 12/2238 248/523 |

\* cited by examiner

*Primary Examiner* — Gwendolyn Baxter
(74) *Attorney, Agent, or Firm* — Plager Schack LLP

(57) ABSTRACT

A mount system for an umbrella includes a base configured to be adhered to a ground surface. An attachment assembly is connected to the base. A main tube assembly is connected to the attachment assembly with a key such that the key can hold the main tube assembly to the base at any angle. An umbrella is connected to the main tube assembly.

9 Claims, 5 Drawing Sheets

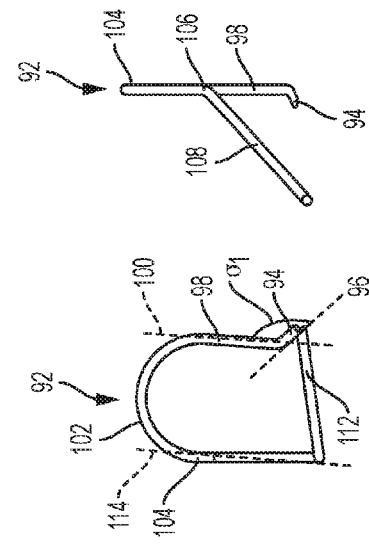
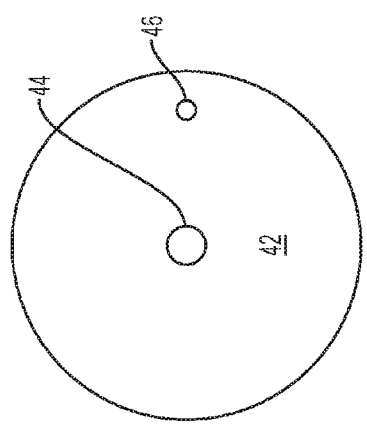
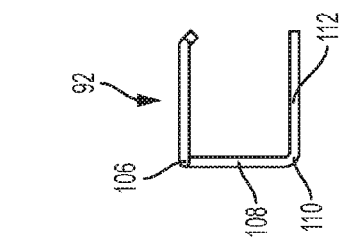
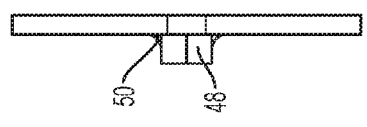
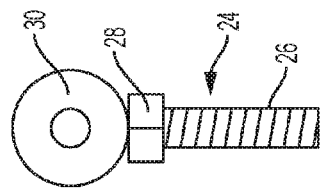
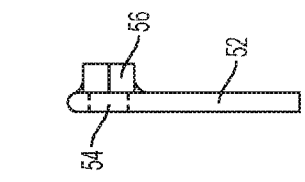
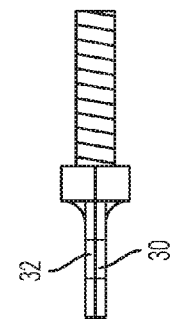
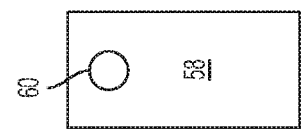

MOUNT SYSTEM FOR AN UMBRELLA

RELATED APPLICATION

This application is a continuation in part of U.S. non-provisional patent application Ser. No. 15/043,416 which, in turn, claims priority to provisional patent application U.S. Ser. No. 62/115,566 filed on Feb. 12, 2015, the entire contents of both applications is herein incorporated by reference.

BACKGROUND

The embodiments herein relate generally to an umbrella mount system.

Prior to embodiments of the disclosed invention, there was no theory for an umbrella mount system adhering to a flat smooth surface while providing a 220 degree pivot for the umbrella. Additionally, there was no system with an extension member or a para cord tie down. There was no other unit that can be moved without tightening or loosening. Embodiments of the disclosed invention solve these problems.

SUMMARY

A mount system for an umbrella includes a base configured to be adhered to a ground surface. An attachment assembly is connected to the base. A main tube assembly is connected to the attachment assembly with a key such that the key can hold the main tube assembly to the base at any angle. An umbrella is connected to the main tube assembly. In some embodiments, the umbrella is connected to the main tube assembly with an extension tube.

BRIEF DESCRIPTION OF THE FIGURES

The detailed description of some embodiments of the invention is made below with reference to the accompanying figures, wherein like numerals represent corresponding parts of the figures.

FIG. 1A shows front view of an embodiment of a second plate of the present invention.

FIG. 1B shows side view of an embodiment of a first plate of the present invention.

FIG. 2A shows a side view of an embodiment of a base connection member of the present invention.

FIG. 2B shows a top view of an embodiment of a base connection member of the present invention.

FIG. 3A shows a side view of an embodiment of a key of the present invention.

FIG. 3B shows a front view of an embodiment of a key of the present invention.

FIG. 4A shows a top view of an embodiment of a clip of the present invention.

FIG. 4B shows a side view of an embodiment of a clip of the present invention.

FIG. 4C shows a front view of an embodiment of a clip of the present invention.

DETAILED DESCRIPTION OF CERTAIN EMBODIMENTS

Figure 10:
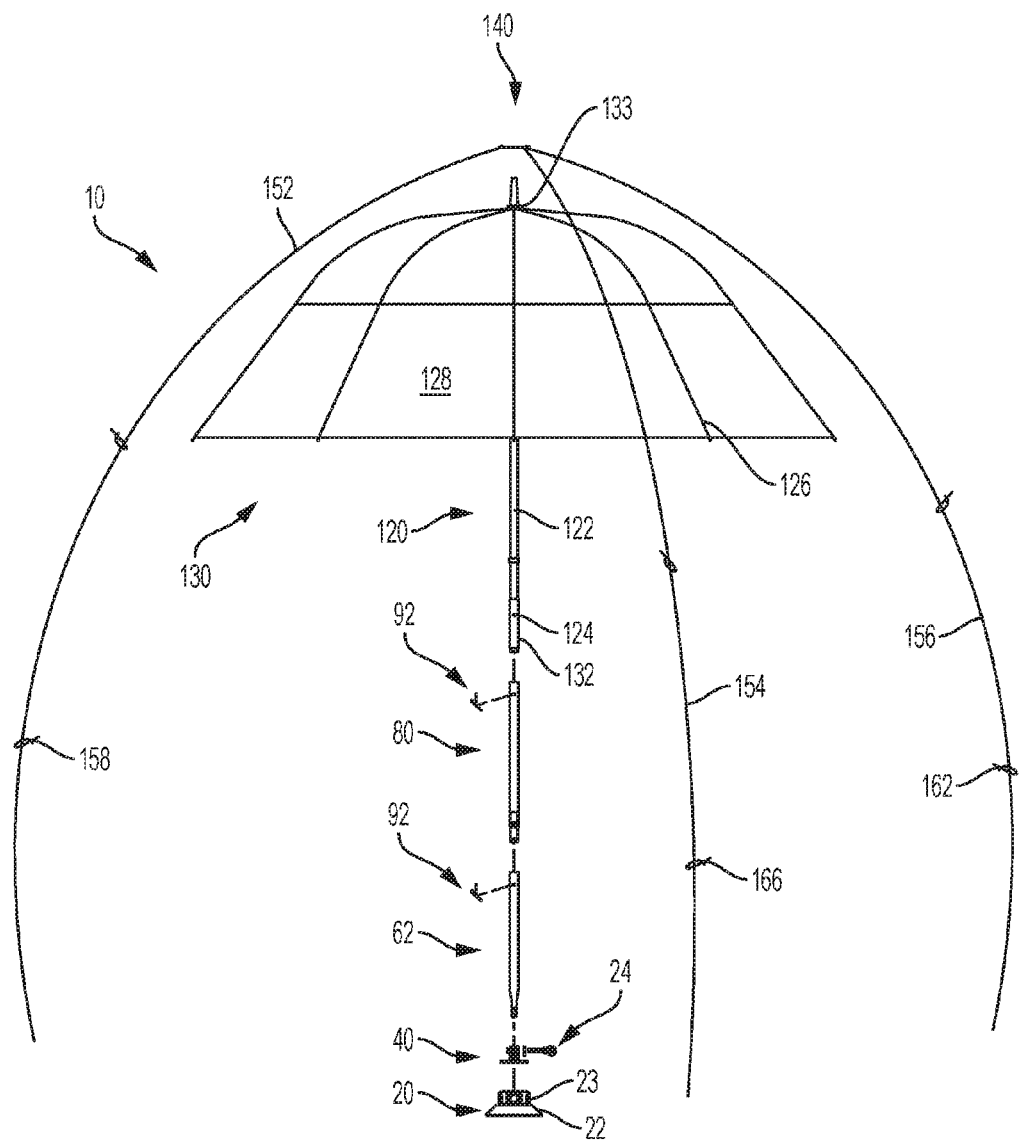
FIG. 10 shows an assembly view of an embodiment of the present invention.
Figure 11:
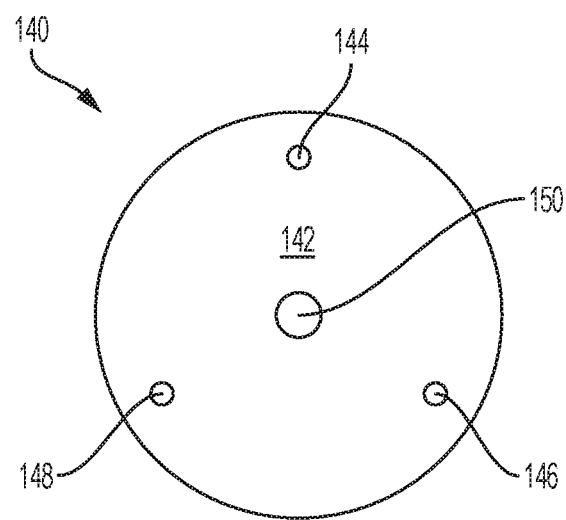
FIG. 11 shows a top view of the tie down disc of the present invention.

By way of example, and referring to FIG. 10, one embodiment of mount system 10 further comprises base 20. Base 20 is attached to attachment assembly 40. Attachment assembly 40 is attached to main tube assembly 62. Main tube assembly 62 is attached to extension tube assembly 80. Extension tube assembly 80 is attached to umbrella 120. Umbrella 120 is attached to tie-down assembly 140.

Base 20 further comprises ground connection member 22 joined to attachment assembly connection member 23. Ground connection member 22 can be simply placed on a ground surface in some embodiments. In other embodiments, ground connection member 22 can be tethered to the ground surface. In some embodiments, ground connection member 22 can be a suction cup. In some embodiments, ground connection 22 can be a device made from Woods Power Grip®.

Key 24 further comprises threaded section 26 joined to head 28. Head 28 is joined to first washer 30 and second washer 32. Key 24 can be inserted through first plate opening 54, second plate opening 60 and threaded onto first plate fastener 56. In some embodiments, support washer 30 can also be used. In some embodiments, the materials used to make key 24 can enable the system to rotate and stay in place without further tightening or loosening. In some embodiments main tube assembly 62 and extension tube assembly 80 can be made from galvanized steel. This allows the system to rotate and stay in place without further tightening or loosening.

Figure 5:
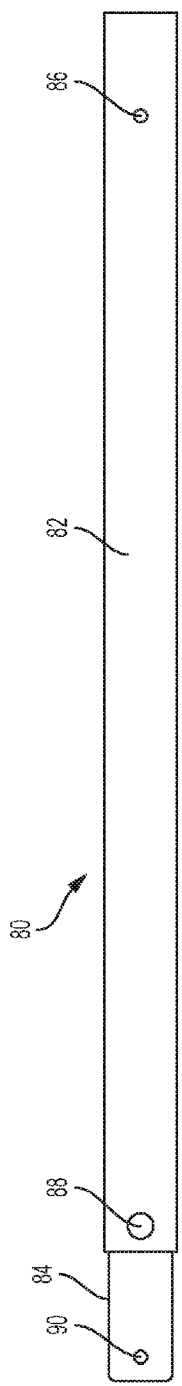
FIG. 5 shows a side view of an embodiment of a extension tube assembly of the present invention.
Figure 6:
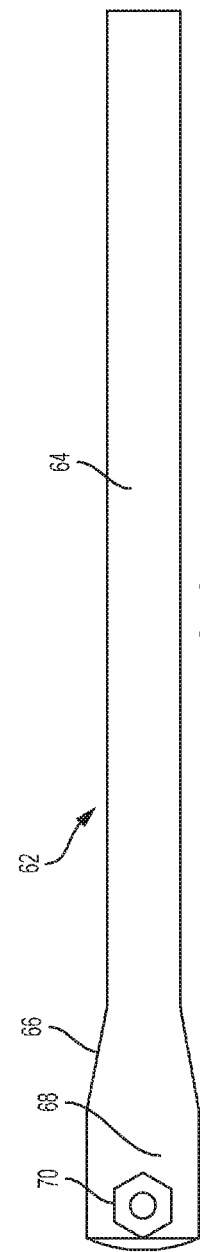
FIG. 6 shows a top view of an embodiment of a main tube assembly of the present invention.
Figure 7:
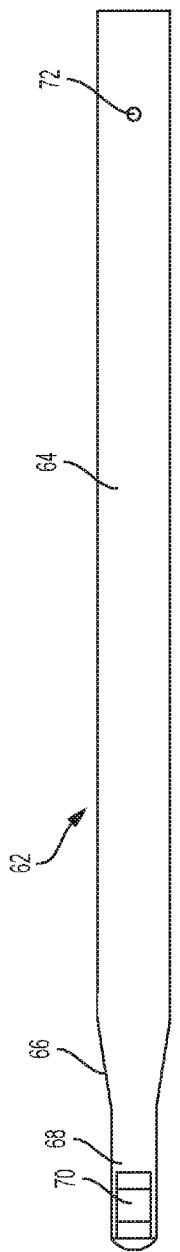
FIG. 7 shows a side view of an embodiment of a main tube assembly of the present invention.
Figure 8:
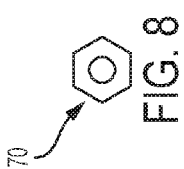
FIG. 8 shows a top view of an embodiment of a nut of the present invention.
Figure 9:
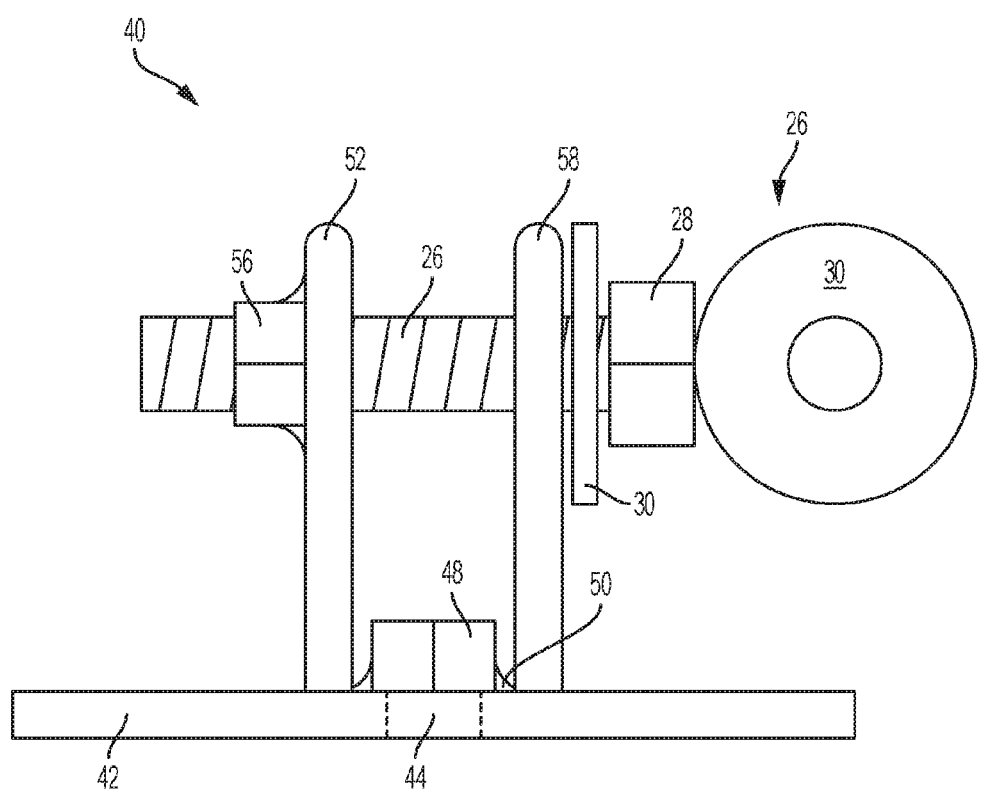
FIG. 9 shows a front view of an embodiment of an attachment assembly of the present invention.

Attachment assembly 40 is further shown in FIG. 9. Attachment assembly 40 further comprises base connection member 42. Base connection member 42 further comprises central opening 44 and side opening 46. Base connection member 42 is mechanically coupled to fastener 48. In some embodiments, this can be done with welding 50.

Base connection member 42 is further mechanically coupled to first plate 52. First plate 52 further comprises first plate opening 54. First plate fastener 56 is welded to first plate 52 proximate first plate opening 54. Base connection member 42 is further attached to second plate 58. Second plate 58 further comprises second plate opening 60.

Main tube assembly 62 further comprises tube 64. Tube 64 is smoothly connected to transition section 66. Transition section 66 is smoothly connected to flattened end 68. Flattened end 68 is mechanically coupled to nut 70. Tube 64 further comprises main tube opening 72.

Extension tube assembly 80 further comprises wide tube 82 mechanically coupled to rod 84. Wide tube 82 further comprises first wide tube opening 86 and second wide tube opening 88. Narrower rod 84 further comprises narrower rod opening 90.

Clip 92 further comprises first flat portion 94. First flat portion 94 is parallel to and collinear with first flat portion axis 96. First flat portion 94 is smoothly connected to second flat portion 98. Second flat portion 98 is parallel to and collinear with second flat portion axis 100. First angle θ1 can be measured clockwise from first flat portion axis 96 to second flat portion axis 100. First angle θ1 is obtuse, and preferably about 135 degrees.

Second flat portion 98 is smoothly connected to first round portion 102. First round portion 102 is smoothly connected to third flat portion 104. Third flat portion 104 is connected to second rounded portion 106. Second rounded portion 106 is smoothly connected to fourth flat portion 108. Fourth flat portion 108 is smoothly connected to third rounded portion 110. Third rounded portion 110 is smoothly connected to fifth flat portion 112. Third flat portion 104 is parallel to and collinear to third flat portion axis 114. Third flat portion axis 114 is parallel to second flat portion axis 100.

Umbrella 120 further comprises umbrella tube 122. Umbrella tube 122 further comprises umbrella tube opening 124. Umbrella tube 122 is joined to a plurality of ribs 126 around which canvas 128 is placed forming canopy 130. The plurality of ribs 126 extend from open cap 133 providing an apex for canopy 130. Umbrella tube 122 further comprises shrink tube 132. Note that there is no ferrule on umbrella tube 122, thus there is a place to accommodate tie down assembly 140.

Tie down assembly 140 further comprises tie down disc 142 which further comprises first tie down disc opening 144, second tie down disc opening 146 and third tie down disc opening 148, and disc central opening 150. First para cord 152 is joined to first tie down disc opening 144. Second para cord 154 is joined to second tie down disc opening 146. Third para cord 156 is joined to third tie down disc opening 148.

First para cord 152 can be joined to a ground surface with first tie down 158. Second para cord 154 can be joined to a ground surface with second tie down 160. Third para cord 156 can be joined to a ground surface with third tie down 162.

To assemble mount system 10, base system 20 is joined to attachment assembly 40. Attachment assembly 40 is joined to main tube assembly 62 with key 24. Main tube assembly 62 is joined to extension tube assembly 80 with first clip 92. Extension tube assembly 80 is joined to umbrella 120 with second clip 92. Notably, main tube assembly 62 can be attached at any angle to attachment assembly 40 and screwed into place with key 24.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. §112, ¶6. In particular, any use of "step of" in the claims is not intended to invoke the provision of 35 U.S.C. §112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mount system for an umbrella, the mount system comprising:
    a base configured to be adhered to a ground surface;
    an attachment assembly connected to the base; wherein the attachment assembly further comprises:
        a base connection member, mechanically coupled to a fastener and further comprising a central opening and a side opening;
        a first plate, attached to the base connection member and further comprising a first plate opening;
        a second plate, attached to the base connection member and further comprising a second plate opening;
    a main tube assembly connected to the attachment assembly with a key such that the key can hold the main tube assembly to the base at any angle;
    an extension tube assembly, joined to the main tube assembly and the umbrella; and
    wherein the umbrella is connected to the main tube assembly.

2. The mount system of claim 1, wherein the base further comprises a ground connection member joined to an attachment assembly connection member; wherein the attachment assembly connection member is directly attached to the attachment assembly.

3. The mount system of claim 1, wherein the key further comprises:
    a threaded section joined to head;
    a first washer and a second washer, joined to the head
    wherein the key is inserted through the first plate opening, the second plate opening and threaded onto a first plate fastener.

4. The mount system of claim 1, wherein the tube extension assembly further comprises:
    a wide tube, attached to a rod;
    a first wide tube opening and a second wide tube opening bore through the wide tube; and
    a rod opening, bore through the rod.

5. A mount system for an umbrella, the mount system comprising:
    a base configured to be adhered to a ground surface;
    an attachment assembly connected to the base; wherein the attachment assembly further comprises:
        a base connection member, mechanically coupled to a fastener and further comprising a central opening and a side opening;
        a first plate, attached to the base connection member and further comprising a first plate opening;

a second plate, attached to the base connection member and further comprising a second plate opening;

a main tube assembly connected to the attachment assembly with a key such that the key can hold the main tube assembly to the base at any angle; and an umbrella connected to the main tube assembly.

6. The mount system of claim 5, wherein the base further comprises a ground connection member joined to an attachment assembly connection member; wherein the attachment assembly connection member is directly attached to the attachment assembly.

7. The mount system of claim 5, wherein the key further comprises:

a threaded section joined to head;

a first washer and a second washer, joined to the head wherein the key is inserted through the first plate opening, the second plate opening and threaded onto a first plate fastener.

8. A mount system for an umbrella, the mount system comprising:

a base configured to be adhered to a ground surface;

an attachment assembly connected to the base; wherein the attachment assembly further comprises:

a main tube assembly connected to the attachment assembly with a key such that the key can hold the main tube assembly to the base at any angle; wherein the key further comprises:

a threaded section joined to head;

a first washer and a second washer, joined to the head; and wherein the key is inserted through the first plate opening, the second plate opening and threaded onto a first plate fastener;

an umbrella connected to the main tube assembly.

9. The mount system of claim 8, wherein the base further comprises a ground connection member joined to an attachment assembly connection member; wherein the attachment assembly connection member is directly attached to the attachment assembly.

* * * * *